(12) United States Patent
Asmussen et al.

(10) Patent No.: US 10,210,896 B2
(45) Date of Patent: Feb. 19, 2019

(54) WIRELESS TAPE CARTRIDGE HANDLING

(71) Applicant: International Business Machines Corporation, Armonk, NY (US)

(72) Inventors: Ole Asmussen, Henstedt-Ulzburg (DE); Robert Beiderbeck, Wassenberg (DE); Frank Krick, Ockenheim (DE); Markus Schaefer, Heiligenmoschel (DE)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/276,851

(22) Filed: Sep. 27, 2016

(65) Prior Publication Data

US 2018/0090165 A1   Mar. 29, 2018

(51) Int. Cl.
*G06F 7/00* (2006.01)
*G11B 15/68* (2006.01)
*G11B 5/008* (2006.01)

(52) U.S. Cl.
CPC ........ *G11B 15/689* (2013.01); *G11B 5/00813* (2013.01); *G11B 15/6835* (2013.01)

(58) Field of Classification Search
None
See application file for complete search history.

(56) References Cited

U.S. PATENT DOCUMENTS

| 6,550,391 | B1* | 4/2003 | Ostwald | G11B 15/6805 |
| | | | | 104/88.02 |
| 6,710,962 | B1* | 3/2004 | Caverly | G11B 15/6835 |
| | | | | 360/69 |
| 6,909,940 | B2 | 6/2005 | Hellman et al. | |
| 7,626,895 | B2 | 12/2009 | Goodman et al. | |
| 7,751,141 | B2 | 7/2010 | Chamorro et al. | |
| 8,384,244 | B2 | 2/2013 | Peterson et al. | |
| 8,767,330 | B2 | 7/2014 | Heineman et al. | |
| 9,202,507 | B1 | 12/2015 | Krick et al. | |
| 9,242,796 | B1 | 1/2016 | Krick et al. | |
| 9,586,758 | B2 | 3/2017 | Acevedo et al. | |
| 9,733,646 | B1 | 8/2017 | Nusser et al. | |
| 9,733,839 | B2 | 8/2017 | Johnson et al. | |
| 9,776,326 | B2 | 10/2017 | Zevenbergen et al. | |
| 2004/0254678 | A1* | 12/2004 | Hellman | B65G 1/0407 |
| | | | | 700/245 |
| 2013/0177371 | A1 | 7/2013 | Manes et al. | |
| 2013/0272838 | A1 | 10/2013 | Holden et al. | |

(Continued)

OTHER PUBLICATIONS

Asmussen et al., "Wireless Tape Cartridge Handling", U.S. Appl. No. 15/858,003, filed Dec. 29, 2017, 26 pages.

(Continued)

*Primary Examiner* — Yolanda R Cumbess
(74) *Attorney, Agent, or Firm* — Brian M. Restauro

(57) ABSTRACT

The system includes a base frame and a controller attached to the base frame. An access point is attached to the controller. The base frame includes a plurality of tape drive slots. A plurality of frames are attached to the base frame. Each frame in the plurality of frames includes a plurality of tape slots. A tape cartridge is stored in a tape slot. An x-y-z movement system is connected to the base frame and the plurality of frames. A wireless network is connected to the base frame.

11 Claims, 4 Drawing Sheets

(56) References Cited

U.S. PATENT DOCUMENTS

2015/0117992 A1* 4/2015 Nagasawa ............ G11B 15/675
                                                                          414/273
2016/0079787 A1   3/2016 Yechieli

OTHER PUBLICATIONS

IBM, "List of Patent Applications Treated As Related", Appendix P, Dated Dec. 29, 2017, 2 pages.

Asmussen et al., "Using a Rechargeable Power Source for Tape Cartridge Handling", U.S. Appl. No. 15/896,463, filed Feb. 14, 2018, 24 pages.

IBM, "List of Patent Applications Treated As Related", Appendix P, Dated Feb. 13, 2018, 2 pages.

Asmussen et al., "Using a Rechargeable Power Source for Tape Cartridge Handling", Filed Sep. 27, 2016, U.S. Appl. No. 15/276,858, 26 Pages.

Appendix P—List of IBM Patents or Patent Applications Treated as Related, Filed Sep. 27, 2016, 2 Pages.

IBM, "IBM TS4500 tape library models deliver higher storage density, integrated storage management, and improved ease of use", IBM United States Hardware Announcement 114-072, dated May 19, 2014, IBM®, 45 pages.

Panasonic, "Panasonic Commercializes the Industry's Smallest 1 Pin Shapped Lithium Ion Battery", Panasonic Corporation Oct. 2014, 4 pages, <http://news.panasonic.com/global/press/data/2014/10/en141003-2/en141003-2.html>.

* cited by examiner

WIRELESS TAPE CARTRIDGE HANDLING

BACKGROUND

The present invention relates generally to the field of magnetic tape libraries, and more particularly to wirelessly handling tape cartridges in an automated tape library.

Magnetic tape data storage (e.g., an automated tape library) is a system for storing digital information on magnetic tape using digital recording. Modern magnetic tape is most commonly packaged in cartridges and cassettes. The tape drive is the device that performs writing or reading of data on the magnetic tape. Autoloaders automate cartridge handling and provide increased speed for accessing data. Several components in the cartridge handling system, including the x-y-z driver, x-slider, y-slider, and gripper, are connected via a flat, or ribbon, cable. A common cassette-based format is Linear Tape-Open (LTO). The LTO format is available in a variety of densities and is manufactured by several companies.

SUMMARY OF THE INVENTION

Embodiments of the present invention include a system for wirelessly handling tape cartridges in an automated tape library. In one embodiment, the system includes a base frame and a controller attached to the base frame. An access point is attached to the controller. The base frame includes a plurality of tape drive slots. A plurality of frames are attached to the base frame. Each frame in the plurality of frames includes a plurality of tape slots. A tape cartridge is stored in a tape slot. An x-y-z movement system is connected to the base frame and the plurality of frames. A wireless network is connected to the base frame.

Embodiments of the present invention include a method for wireless communication in an automated tape library. In one embodiment, a request is received. The request includes an instruction to move an item from a first location to a second location. The instruction is transmitted from an access point in a controller to a transceiver in a power-control unit using a wireless network that connects the access point and the transceiver.

DETAILED DESCRIPTION

Embodiments of the present invention provide for wirelessly handling tape cartridges in an automated tape library. Current techniques for handling tape cartridges utilize a flat, or ribbon, cable to provide communication between the tape library controller, the x-y-z driver, and other components in the tape library. The flat cable is susceptible to wear because of the flexing the cable receives while components are in motion within the tape library to move tape cartridges between storage slots and tape drives, where the tape cartridge is either written to (storing data) or read (retrieving data). The wear to the cable may result in errors moving tape cartridges. Consequently, the cable needs to be replaced often.

Embodiments of the present invention recognize that there may be a method, computer program product, and computer system for wirelessly handling tape cartridges in an automated tape library, which may eliminate the need for the flat cable and the time required to replace a worn cable. Embodiments of the present invention may use a rechargeable power source to provide power to the following: components within the tape library, charging stations within the tape library that provide recharging power to the rechargeable power sources, and a wireless network that provides digital communication between the library/charging network controller and the x-y-z driver/gripper in the library that moves the tape cartridges from one location to another within the tape library. Throughout this document, x-y-z will refer to three different axes that the driver/gripper assembly can move within the tape library. In an embodiment, "x" will refer to horizontal (i.e., left/right) travel, "y" will refer to vertical (i.e., up/down) travel, and "z" will refer to depth (i.e., front/back or in/out) travel.

The present invention will now be described in detail with reference to the Figures.

Figure 1:
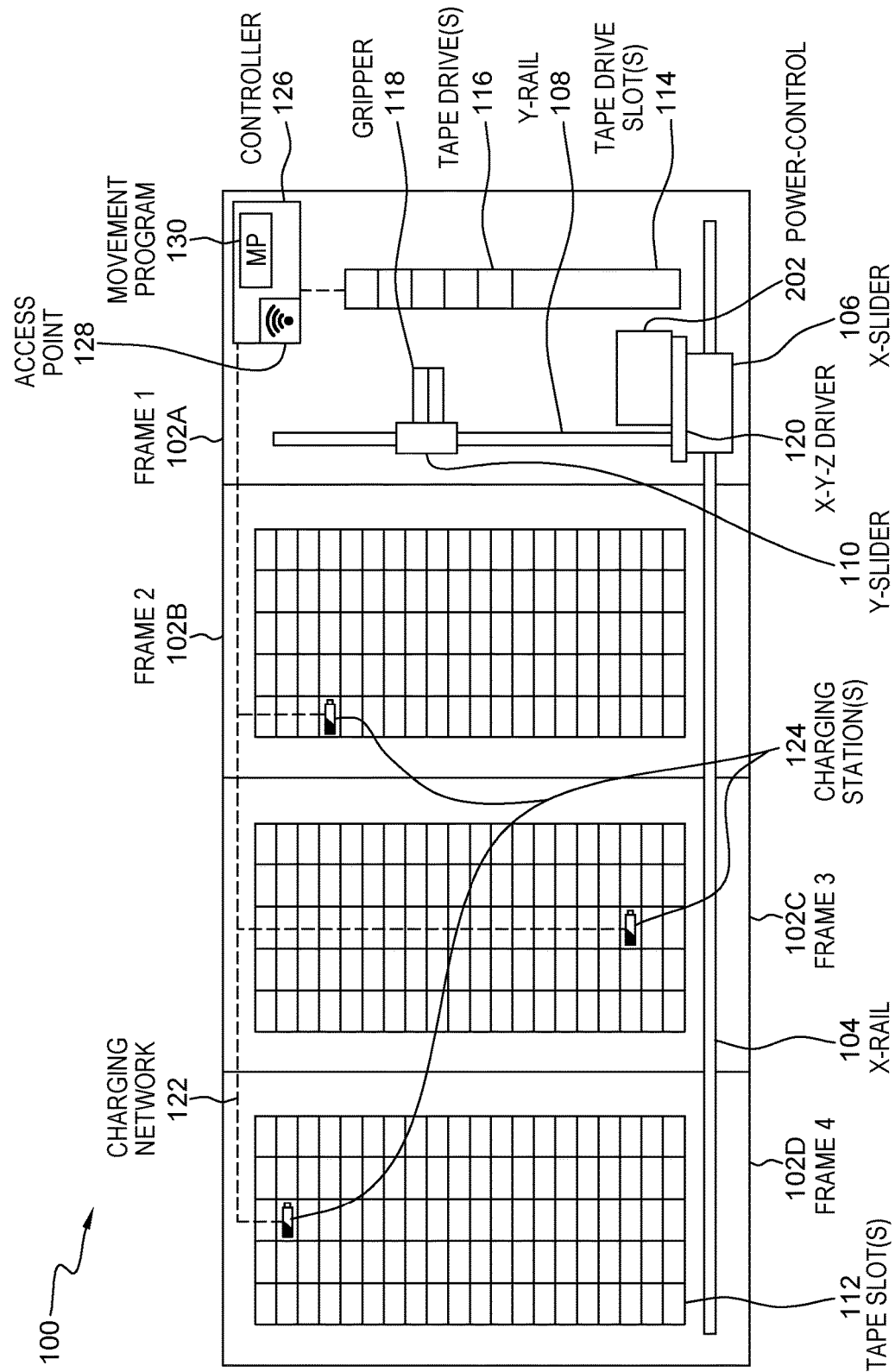
FIG. 1 depicts a schematic of an automated tape library, in accordance with an embodiment of the present invention.

FIG. 1 is a schematic of an automated tape library, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, automated tape library 100 includes frame 1 102A, frame 2 102B, frame 3 102C, frame 4 102D, x-rail 104, x-slider 106, y-rail 108, y-slider 110, tape slot(s) 112, tape drive slot(s) 114, tape drive(s) 116, gripper 118, x-y-z driver 120, charging network 122, charging station(s) 124, controller 126, access point 128, movement program 130, and power-control 202.

In an embodiment, frame 1 102A is the base frame for automated tape library 100. Frame 1 102A is the primary unit of automated tape library 100. In an embodiment, frame 1 102A includes components found in all frames of automated tape library 100 including x-rail 104 and y-rail 108 (components of the automated tape library 100 rail system), internal lighting (not shown), and tape slot(s) 112. In an embodiment, frame 1 102A also includes components controller 126, tape drive slot(s) 114, and tape drive(s) 116.

In an embodiment, frame 2 102B, frame 3 102C, and frame 4 102D are expansion frames, added to base frame 1 102A, to make a four-frame library that comprises automated tape library 100. In an embodiment, there are a maximum number of expansion frames, based on the technology of the tape drive, which can be added to the base frame to comprise the tape library. In an embodiment, frame 2 102B, frame 3 102C, and frame 4 102D include common components found in all frames of automated tape library 100 including x-rail 104 and y-rail 108 (components of the automated tape library 100 rail system), internal lighting (not shown), and tape slot(s) 112. In an embodiment, frame 2 102B, frame 3 102C, and frame 4 102D also include charging network 122 and charging station(s) 124.

In an embodiment, x-rail 104 is a component in the rail system found in automated tape library 100. X-rail 104 allows x-slider 106 to move horizontally in the base frame and any expansion frames in automated tape library 100.

In an embodiment, x-slider 106 is a carrier that moves horizontally on x-rail 104 within automated tape library 100. In an embodiment, x-slider 106 includes y-rail 108 and x-y-z driver 120. One function that x-slider 106 performs is positioning y-rail 108, and consequently gripper 118, in the correct horizontal position for moving a tape cartridge within automated tape library 100.

In an embodiment, y-rail 108 is a component in the rail system found in automated tape library 100. Y-rail 108 allows y-slider 110 to move vertically in the base frame and any expansion frames in automated tape library 100.

In an embodiment, y-slider 110 is carrier that moves vertically on y-rail 108 within automated tape library 100. In an embodiment, y-slider 110 includes gripper 118. One function that y-slider 110 performs is positioning gripper 118 in the correct vertical position for moving a tape cartridge within automated tape library 100.

In an embodiment, tape slot(s) 112 are storage locations for magnetic tape cartridges, power sources, and charging station(s) 124 within automated tape library 100. Both the base frame (frame 1 102A) and the expansion frames (frame 2 102B, frame 3 102C, and frame 4 102D) include any number of tape slot(s) 112. In an embodiment, tape cartridges and power sources may be stacked within a tape slot(s) 112 (i.e., one or more tape cartridge/power source may be stored behind the front or first tape cartridge/power source in the tape slot(s) 112).

In an embodiment, tape drive slot(s) 114 are areas within frame 1 102A (the base frame) of automated tape library 100 used for holding tape drive(s) 116 and charging station(s) 124. In another embodiment, tape drive slot(s) 114 are areas within frame 2 102B, frame 3 102C, and frame 4 102D (the expansion frames) of automated tape library 100 used for holding tape drive(s) 116 and charging station(s) 124. The automated tape library 100 technology determines the number of tape drive slot(s) 114 found in the base frame.

In an embodiment, tape drive(s) 116 are the data storage devices that read and write data on a magnetic tape cartridge. Magnetic tape cartridges are typically used for offline, archival data storage. Magnetic tape cartridges generally have a favorable unit cost and a long archival stability. The number of tape drive(s) 116 found in automated tape library 100 is determined by the number of available tape drive slot(s) 114.

In an embodiment, gripper 118 is an electromechanical device on y-slider 110 for moving tape cartridges and batteries within automated tape library 100. Gripper 118 can move a tape cartridge between tape slot(s) 112 and tape drive(s) 116. Gripper 118 can also move power sources between charging station(s) 124, tape slot(s) 112 and power-control 202 (to be discussed subsequently). In an embodiment, gripper 118 includes two grabbers that physically grab and hold the tape cartridges or the power sources within automated tape library 100. The two grabbers allow gripper 118 to grab the power source powering x-y-z driver 120 that is running low on power with a first grabber, move to charging station(s) 124, grab the power source from charging station(s) 124 with a second grabber, and then swap the two power sources. While the power source swap is occurring, power is being supplied to the system by the second power source in power-control 202, which has a higher charge than the power source in the first grabber that is being replaced.

In an embodiment, x-y-z driver 120 is the device that facilitates all motion requests for gripper 118 within automated tape library 100. X-y-z driver 120 receives input wirelessly from controller 126 via access point 128.

In an embodiment, charging network 122 is an electrical circuit within automated tape library 100 that provides power to charging station(s) 124 for charging the rechargeable power sources when the rechargeable power sources are low on power. In an embodiment, charging network 122 may be a one hundred twenty volt circuit. In another embodiment, charging network 122 may be a two hundred forty volt circuit.

In an embodiment, charging station(s) 124 is a device, powered by charging network 122, which recharges the power sources used by automated tape library 100. In an embodiment, automated tape library 100 includes two charging station(s) 124. In another embodiment, automated tape library 100 includes more than two charging station(s) 124. In an embodiment, charging station(s) 124 includes one slot for charging a power source used by automated tape library 100. In another embodiment, charging station(s) 124 includes more than one slot for charging a power source used by automated tape library 100. In an embodiment, when a power source is fully charged by a charging station(s) 124, the power source is removed from the charging station(s) 124 and moved to an empty tape slot(s) 112.

In an embodiment, controller 126 is a logic card that provides control function to automated tape library 100 and charging network 122. In an embodiment, controller 126 includes access point 128 and movement program 130. Functions managed by controller 126 include centralized management of automated tape library 100, inserting and ejecting operations for tape cartridges, automatic cleaning of tape drive(s) 116, status determination for automated tape library 100, and power requirements for charging network 122 (i.e., provide power to charging station(s) 124 when a non-fully charged power source is present and remove power to charging station(s) 124 when a fully charged power source is present or when charging station(s) 124 is empty).

In an embodiment, access point 128 is a component in a wireless network capable of transmitting and receiving data. In an embodiment, access point 128 may provide a connection to a hard-wired network. In an embodiment, access point 128 sends data to power-control 202 which instructs x-y-z driver 120 where to move (i.e., tape slot(s) 112, tape drive(s) 116, or charging station(s) 124). For example, the instruction may be to retrieve a tape cartridge from a specific tape slot(s) 112 in frame 4 102D and to put the tape cartridge in the first tape drive(s) 116 in frame 1 102A so that data can either be written to or retrieved from the tape cartridge. In another embodiment, access point 128 receives data from power-control 202. In yet another embodiment, access point 128 both sends data to and receives data from power-control 202. In an embodiment, the data transmission is encrypted. In another embodiment, the data transmission is not encrypted.

In an embodiment, access point 128 includes movement program 130. According to embodiments of the present invention, movement program 130 functions to move tape cartridges and power sources within automated tape library 100. In an embodiment, movement program 130 receives input of an instruction to move a tape cartridge, transmits the instruction wirelessly using techniques known in the art, directs the gripper mechanism in automated tape library 100 to the proper location to grab the tape cartridge, and directs the gripper to another location in automated tape library 100 to place the tape cartridge.

In an embodiment, movement program 130 determines when a power source is low on power and requires swapping for a charged power source stored in charging station(s) 124. In an embodiment, movement program 130 manages the power sources within automated tape library 100 (e.g., the location of each power source and the charge level of each power source). In an embodiment, when a power source swap is required, the power source with the highest charge in tape slot(s) 112 or charging station(s) 124 is selected. In another embodiment, when a power source swap is required, tape slot(s) 112 or charging station(s) 124 closest to the present location of x-y-z driver 120 is selected. In yet another embodiment, the current workload queue is used to determine which tape slot(s) 112 or charging station(s) 124 is used for the power source swap (e.g., if only one tape cartridge movement is in the queue, any tape slot(s) 112 or charging station(s) 124 may be used but if many movements are in the queue, the tape slot(s) 112 or charging station(s) 124 with the power source with the highest charge is used for the swap).

Figure 2:
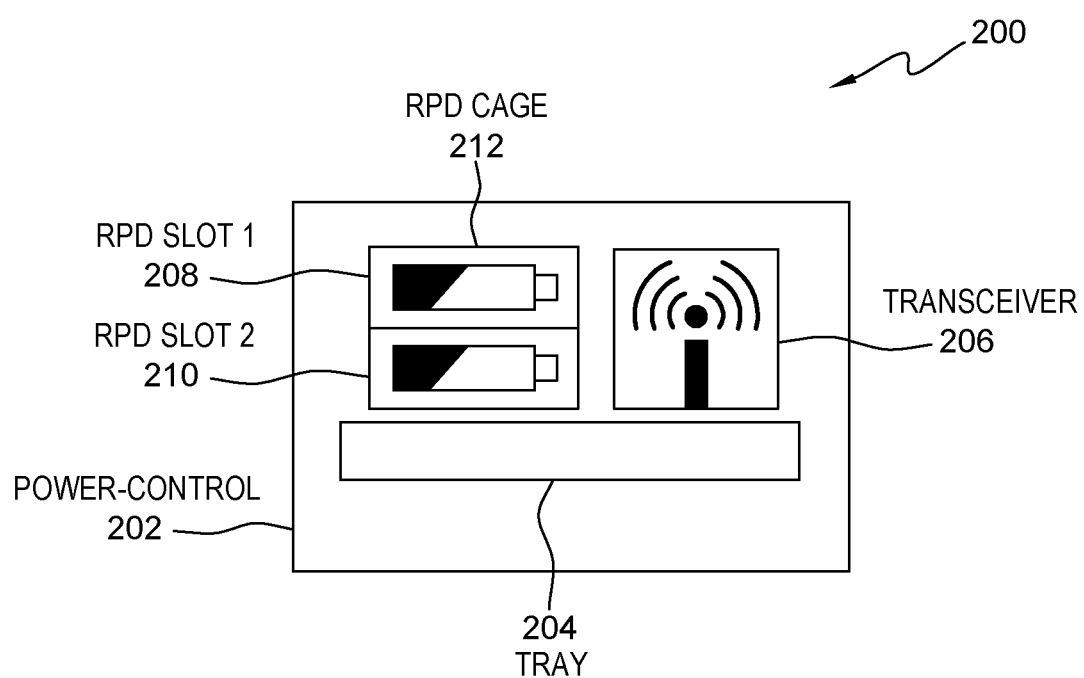
FIG. 2 depicts a schematic of a power-control module within an automated tape library, in accordance with an embodiment of the present invention.

FIG. 2 is a schematic of power-control 202, generally designated as 200. In an embodiment, power-control 202 includes tray 204, transceiver 206, rpd slot 1 208, rpd slot 2 210 and rpd cage 212.

In an embodiment, tray 204 is a carrier added to x-y-z driver 120 that functions to hold, in a mechanical manner, rpd cage 212. In an embodiment, tray 204 may also serve as a power pass-through, allowing power to pass from rpd cage 212 to x-y-z driver 120.

In an embodiment, transceiver 206 is a combination transmitter/receiver of digital signals in a single package. In an embodiment, transceiver 206 receives data from access point 128. In another embodiment, transceiver 206 sends data to access point 128 (as shown and described in FIG. 1). In yet another embodiment, transceiver 206 both receives data from and sends data to access point 128. In yet another embodiment, transceiver 206 may send and receive data from one or more other components of FIG. 1. In yet another embodiment, transceiver 206 may send and receive data from other access points and/or transceivers not shown.

In an embodiment, rpd cage 212 is a rechargeable power device that provides power to x-slider 106, y-slider 110, gripper 118, x-y-z driver 120, and transceiver 206. In an embodiment, rpd cage 212 includes two slots—rpd slot 1 208 and rpd slot 2 210. In another embodiment, rpd cage 212 may include more than two slots. In an embodiment, each slot in rpd cage 212 (e.g., rpd slot 1 208 and rpd slot 2 210) can hold one rechargeable power source used to provide power. In an embodiment, a power source held in rpd slot 1 208 and rpd slot 2 210 meets the size requirement of fitting into one of the tape slot(s) 112 for storage once the power source is fully charged. In an embodiment, automated tape library 100 may include any number of power sources. The number of power sources required is based on the number of base and expansion frames included in automated tape library 100 as well as the anticipated workload for automated tape library 100. According to embodiments of the present invention, each rechargeable power source may be a battery using any battery technology known in the art (e.g., lithium ion, nickel-cadmium, alkaline, etc.). In another embodiment, each rechargeable power source may be any other power source known in the art (e.g., a super-capacitor, etc.) that meets the size requirements of the two or more slots in rpd cage 212 and meets the power requirements of automated tape library 100. In addition, each of the two or more slots in rpd cage 212 includes the necessary circuitry required to deliver the previously discussed power. In an embodiment, each power source in rpd cage 212 includes at least one bar code label to distinguish each power source from a tape cartridge and to differentiate the two or more power sources from one another.

Figure 3:
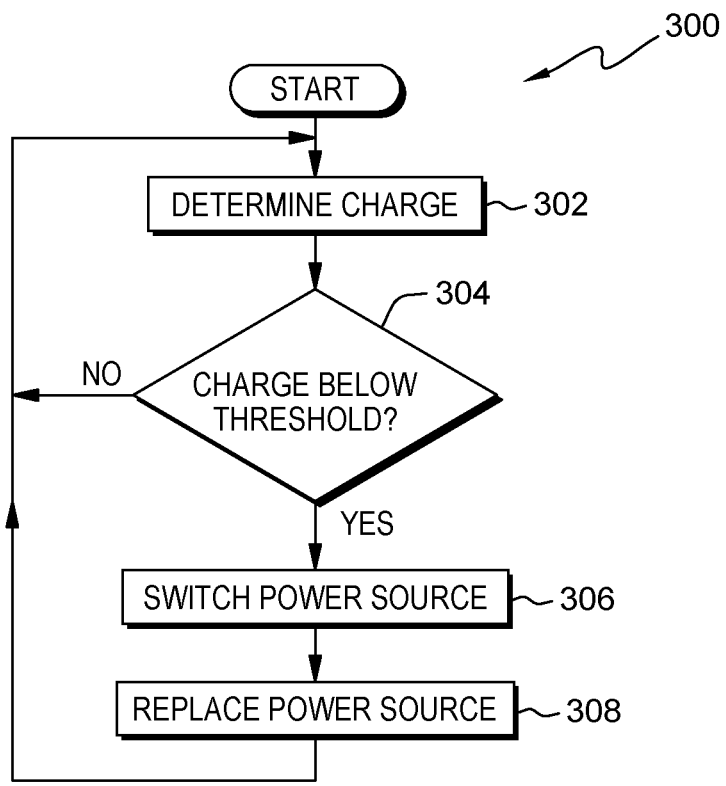
FIG. 3 depicts a flowchart of a program for replacing a power source that is low on power, in accordance with an embodiment of the present invention.

FIG. 3 is a flowchart of workflow 300 depicting a program for replacing a power source based on the power of the power source, in accordance with an embodiment of the present invention. In one embodiment, the method of workflow 300 is performed automatically by movement program 130. In an alternative embodiment, the method of workflow 300 may be initiated at the request of a user.

In an embodiment, movement program 130 determines the charge (step 302). In other words, movement program 130 determines the charge of each of the two or more power sources found in rpd cage 212. In an embodiment, the charge is a measure of remaining power stored in the power source. In an embodiment, any technique known in the art, such as a Coulomb counter, can be used to determine the power source charge. For example, power source "A" in rpd slot 1 208 has a charge of eight percent and power source "B" in rpd slot 2 210 has a charge of ninety-five percent.

In an embodiment, movement program 130 determines whether the charge in any of the two or more power sources found in rpd cage 212 has reached a threshold (decision step 304). In other words, movement program 130 determines whether a power source is running low on power (i.e., reached a threshold level of charge) and needs to be replaced. In an embodiment, the threshold may be defined by a user. In another embodiment, the threshold may be calculated by movement program 130 based on the number of tape retrievals during the life of a power source. In an embodiment (decision step 304, NO branch), a power source has not reached a threshold level of charge; therefore, movement program 130 continues to determine the charge of each of the two or more power sources. In the embodiment (decision step 304, YES branch), a power source has reached a threshold level of charge; therefore, movement program 130 proceeds to step 306.

In an embodiment, movement program 130 switches power source (step 306). In other words, responsive to determining that a power source has reached a threshold level of charge (decision step 304, YES branch), movement program 130 switches the source of power. In an embodiment, movement program 130 switches the power source from the power source located in rpd slot 1 208 to the power source located in rpd slot 2 210. For example, given an example threshold of ten percent, power source "A", with a charge of eight percent, is taken out of service (i.e., is no longer powering a portion of the automated tape library) and power source "B", with a charge of ninety-five percent, is placed into service so that the necessary power requirements are provided by power source "B".

In an embodiment, movement program 130 replaces the power source (step 308). In other words, following the switch in power source (step 306), movement program 130 replaces the low-on-power power source with a charged power source. In an embodiment, the charged power source selected to replace the low-on-power power source is located in tape slot(s) 112 or charging station(s) 124 closest to the present location of power-control 202. In another embodiment, the charged power source selected to replace the low-on-power power source is the power source found in tape slot(s) 112 or charging station(s) 124 with the highest charge level. In yet another embodiment, the charged power source selected to replace the low-on-power power source is chosen based on the remaining workload (i.e., the remaining number of needed movements) in the instruction queue. For example, power source "A", with a charge of eight percent, is replaced with a power source from one of the charging stations with a charge of ninety-nine percent.

Figure 4:
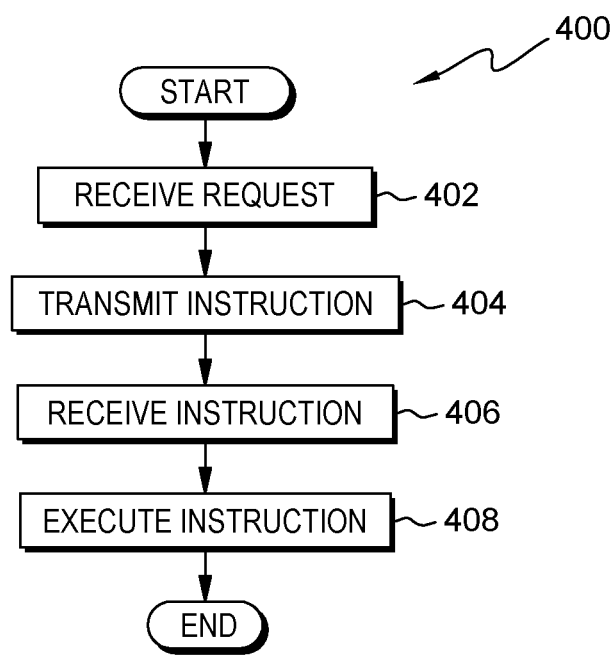
FIG. 4 depicts a flowchart of a program for retrieving a tape cartridge, in accordance with an embodiment of the present invention.

FIG. 4 is a flowchart of workflow 400 depicting a program for moving a tape cartridge based on an instruction, in accordance with an embodiment of the present invention. In one embodiment, the method of workflow 400 is performed automatically by movement program 130 based on one or more instructions received from another computing device. In an alternative embodiment, the method of workflow 300 may be initiated by a user inputting instructions directly to automated tape library 100.

In an embodiment, movement program 130 receives a request (step 402). In other words, movement program 130 receives a request, from a user, to move a tape cartridge from tape slot(s) 112 to a tape drive(s) 116 so that data may be retrieved from the tape cartridge or a request, from controller 126, to replace a rechargeable power source in rpd cage 212. In an embodiment, a user inputs a request to retrieve data stored to a tape cartridge using an integrated management console (not shown) on automated tape library 100. In the embodiment, the request is received by controller 126, which identifies and locates the specific tape cartridge where the requested data is stored. For example, "Joe" inputs a request to retrieve company tax records, stored to tape, from the last twenty-five years. The tape library determines that the requested data is stored to a tape cartridge identified as "TAXREC-HISTORY" via a barcode and that the tape cartridge is stored in slot "Row 3/Column 3" in the first expansion frame in the tape library.

In an embodiment, movement program 130 wirelessly transmits the instruction (step 404). In other words, based on the received request (step 402), movement program 130 wirelessly transmits the instruction required to carry out the request. In an embodiment, controller 126 inputs the determined tape cartridge location to access point 128, which transmits the instruction to retrieve the tape cartridge to transceiver 206. In an embodiment, the transmission is encrypted to prevent anyone else from determining the transmission. In the embodiment, the encryption technique is any encryption technique known in the art. In another embodiment, the transmission is not encrypted. For example, the instruction to retrieve the "TAXREC-HISTORY" cartridge stored in slot "Row 3/Column 3" in the first expansion frame of the tape library is transmitted with encryption from the tape library controller to the power-control module.

In an embodiment, movement program 130 receives the instruction (step 406). In other words, movement program 130 receives the transmitted instruction (step 404) to retrieve a tape cartridge. In an embodiment, the instruction is received by transceiver 206, which is a component of power-control 202. In turn, power-control 202 passes the instruction to x-y-z driver 120 so that the cartridge can be moved from tape slot(s) 112 to tape drive(s) 116 via gripper 118. For example, the instruction to retrieve the "TAXREC-HISTORY" cartridge stored in slot "Row 3/Column 3" in the first expansion frame of the tape library is received by the power-control module and is then passed to the x-y-z driver.

In an embodiment, movement program 130 executes the instruction (step 408). In other words, the received instruction (step 406) to retrieve a tape cartridge is executed by movement program 130. In an embodiment, x-y-z driver 120 positions gripper 118 by moving x-slider 106 horizontally along x-rail 104 and y-slider 110 vertically along y-rail 108 until gripper 118 is in the proper position to grab the requested tape cartridge. In the embodiment, gripper 118 grabs the requested tape cartridge and holds it while x-y-z driver 120 moves the gripper into position at tape drive(s) 116 so that the tape cartridge can be inserted into the tape drive(s) 116 and the data stored to the tape cartridge can be read. For example, the gripper is moved to slot "Row 3/Column 3" in the first expansion frame in the tape library so that the gripper can grab tape "TAXREC-HISTORY" stored in that slot. The gripper is then moved to an open tape drive where the tape cartridge is inserted into the open tape drive and the tax records are read and made available to "Joe".

Figure 5:
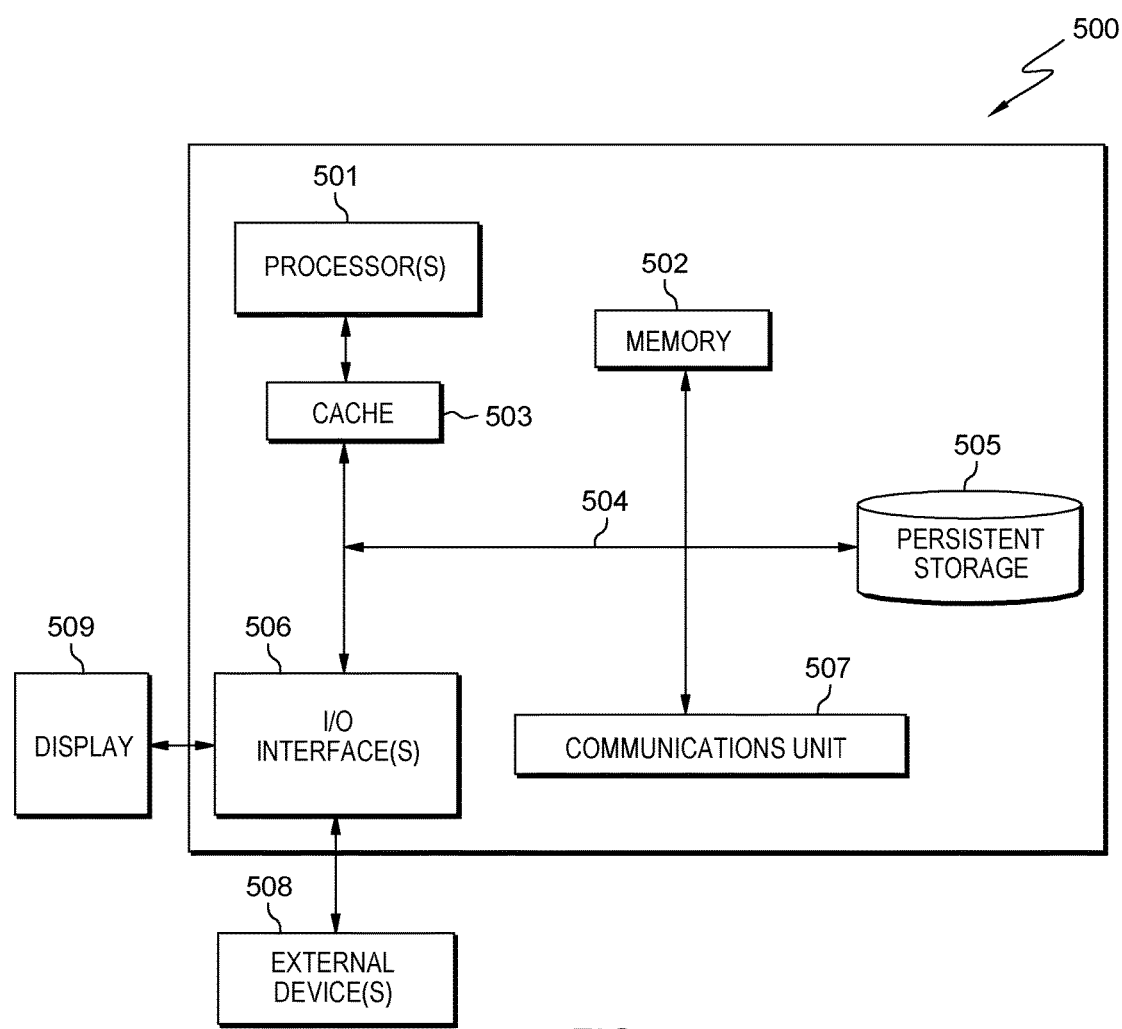
FIG. 5 depicts a block diagram of components of a computing environment, in accordance with an embodiment of the present invention.

FIG. 5 depicts computer system 500, which is an example of a system that includes movement program 130. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface (s) 506 also connect to display 509.

Display 509 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for wireless management of an automated tape library, the system comprising:
   a base frame;
   a controller attached to the base frame;
   an access point connected to the controller, wherein the access point transmits at least one movement instruction;
   a plurality of tape drive slots in the base frame;
   a plurality of frames attached to the base frame;
   a plurality of tape slots in each frame of the plurality of frames, wherein a tape cartridge is stored in a tape slot;
   an x-y-z movement system connected to the base frame and the plurality of frames;
   a wireless network connected to the base frame;
   a power-control unit connected to an x-y-z driver included in the x-y-z movement system;
   a transceiver connected to the power-control unit;
   two or more rechargeable power sources connected to the power-control unit, wherein at least one rechargeable power source of the two or more rechargeable power sources provides power to the power-control unit;
   a charging network, wherein the charging network connects the controller to a plurality of charging stations in the plurality of frames; and
   a plurality of rechargeable power sources, wherein
      a location of each rechargeable power source of the plurality of rechargeable power sources is selected from the group consisting of the power-control unit, the plurality of charging stations, and the plurality of tape slots, and
      the plurality of rechargeable power sources use a technology selected from the group consisting of an alkaline battery, a nickel-cadmium battery, a lithium ion battery, and a super-capacitor.

2. The system of claim 1, wherein the x-y-z movement system includes:
   an x-y-z driver;
   an x-rail connected to the plurality of frames;
   an x-slider connected to the x-y-z driver, wherein the x-slider moves along the x-rail;
   a y-rail connected to the x-y-z driver;
   a y-slider connected to the y-rail, wherein the y-slider moves along the y-rail; and
   a gripper connected to the y-slider.

3. The system of claim 2, wherein the x-y-z driver controls the movement of the x-slider, the y-slider, and the gripper.

4. The system of claim 2, wherein the gripper includes two or more grabbers, and wherein the two or more grabbers are used to move a tape cartridge or a rechargeable power source.

5. The system of claim 1, wherein the charging network provides a wired connection between the controller and the plurality of charging stations, and wherein the plurality of charging stations recharge the plurality of rechargeable power sources using the wired connection.

6. The system of claim 1, wherein the wireless network includes the access point and the transceiver.

7. The system of claim 6, wherein the access point sends an instruction via the wireless network, and wherein the transceiver receives the instruction via the wireless network.

8. A method for wireless communication in an automated tape library, the method comprising:
   receiving, by one or more computer processors, a request, wherein the request includes an instruction to move an item within the automated tape library from a first location to a second location;
   the tape library comprising: at least one tape cartridge, at least one rechargeable power source, at least one charging station, an access point capable of transmitting and receiving data, and a transceiver coupled to a power-control unit, the transceiver capable of receiving data from the access point and transmitting data to the access point, and the power-control unit is connected to a movement system for moving the items;
      wherein the item to move is selected from the group consisting of the at least one tape cartridge and the at least one rechargeable power source, and
      the tape library further comprising: at least one tape slot, a tape drive, at least one charging station, and at least one rechargeable power device slot; and
      the first location and the second location is selected from the group consisting of the at least one tape slot, the tape drive, the at least one charging station, and the at least one rechargeable power device slot;
   transmitting, by one or more computer processors, the instruction, from the access point in a controller to the transceiver in the power-control unit using a wireless network connecting the access point and the transceiver; and
   receiving, by one or more computer processors, an indication from the transceiver, via the access point over the wireless network, that the item has been moved to the second location.

9. The method of claim 8, further comprising:
   transmitting, by one or more computer processors, the received request to an x-y-z driver; and
   executing, by one or more compute processors, the received request, wherein the received request is executed by the x-y-z movement system based on one or more inputs from the x-y-z driver to move the item from the first location to the second location.

10. The method of claim 8, wherein the received request is selected from the group consisting of an instruction from a user to move a tape cartridge and an instruction from the controller to move a rechargeable power source.

11. A computer program product for wireless communication in an automated tape library, the computer program product comprising:
one or more computer readable storage media; and
program instructions stored on the one or more computer readable storage media, the program instructions comprising:
program instructions to receive a request, wherein the request includes an instruction to move an item within the automated tape library from a first location to a second location;
the tape library comprising: at least one tape cartridge, at least one rechargeable power source, at least one charging station, an access point capable of transmitting and receiving data, and a transceiver coupled to a power-control unit, the transceiver capable of receiving data from the access point and transmitting data to the access point, and the power-control unit is connected to a movement system for moving the items;
wherein the item to move is selected from the group consisting of the at least one tape cartridge and the at least one rechargeable power source, and
the tape library further comprising: at least one tape slot, a tape drive, at least one charging station, and at least one rechargeable power device slot; and
the first location and the second location is selected from the group consisting of the at least one tape slot, the tape drive, the at least one charging station, and the at least one rechargeable power device slot;
program instructions to transmit the instruction, from the access point in a controller to the transceiver in the power-control unit using a wireless network connecting the access point and the transceiver; and
program instructions to receive an indication from the transceiver, via the access point over the wireless network, that the item has been moved to the second location.

* * * * *